US011222579B1

United States Patent
Lin et al.

(10) Patent No.: US 11,222,579 B1
(45) Date of Patent: Jan. 11, 2022

(54) SHIFT REGISTER CIRCUIT

(71) Applicant: Au Optronics Corporation, Hsinchu (TW)

(72) Inventors: Cheng-Hsing Lin, Hsinchu (TW); Shu-Wen Tzeng, Hsinchu (TW); Jui-Chi Lo, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/239,711

(22) Filed: Apr. 26, 2021

(30) Foreign Application Priority Data

Dec. 7, 2020 (TW) .................................. 109143116

(51) Int. Cl.
*G09G 3/20* (2006.01)
*G06F 3/041* (2006.01)

(52) U.S. Cl.
CPC ......... *G09G 3/2092* (2013.01); *G06F 3/0412* (2013.01); *G09G 2310/0286* (2013.01); *G09G 2310/08* (2013.01)

(58) Field of Classification Search
CPC ... G09G 2310/0267; G09G 2310/0286; G09G 3/20; G06F 3/0412; G06F 3/0416; G06F 3/04166
See application file for complete search history.

(56) References Cited

U.S. PATENT DOCUMENTS

| 8,325,127 | B2 | 12/2012 | Chang et al. | |
| 2016/0334908 | A1* | 11/2016 | Zhuang | G06F 3/0412 |
| 2020/0005701 | A1* | 1/2020 | Chen | G09G 3/2092 |
| 2020/0005706 | A1* | 1/2020 | Li | G06K 9/0004 |
| 2020/0210668 | A1* | 7/2020 | Jhang | G06F 3/0446 |
| 2021/0073504 | A1* | 3/2021 | Shih | G06F 3/0412 |
| 2021/0200980 | A1* | 7/2021 | Xu | G06K 9/00013 |

* cited by examiner

*Primary Examiner* — Hong Zhou
(74) *Attorney, Agent, or Firm* — JCIPRNET

(57) ABSTRACT

A shift register circuit includes a first dummy shift register, a second dummy shift register, multiple shift registers, multiple module selection switches, and multiple output selectors. The shift registers are connected in series between the first dummy shift register and the second dummy shift register, and are divided into a plurality of shift register groups. The module selection switches jointly receive a module selection signal, and are respectively coupled between the first dummy shift register and the shift register groups or between the shift register groups. The output selectors are respectively coupled between an output terminal of the corresponding one of the first dummy shift register, the shift registers, and the second dummy shift register, and a display panel and a fingerprint sensor module.

17 Claims, 5 Drawing Sheets

SHIFT REGISTER CIRCUIT

CROSS-REFERENCE TO RELATED APPLICATION

This application claims the priority benefit of Taiwan application serial no. 109143116, filed on Dec. 7, 2020. The entirety of the above-mentioned patent application is hereby incorporated by reference herein and made a part of this specification.

BACKGROUND

Technical Field

The disclosure relates to a drive circuit, and more particularly relates to a shift register circuit.

Description of Related Art

As the popularity of mobile payment increases, the demand for information security is also arising. Fingerprint sensors are used in display panels in response to such market demand. Because the scan signals (or gate signals) of the fingerprint sensor module and the display panel have different enabling times (that is, turn-on times), the fingerprint sensor module and the display panel do not share the scan signals (or gate signals). In other words, the drive circuits for generating the scan signals (or gate signals) are independent of each other. Therefore, the display panel provided with the built-in fingerprint sensor module requires two sets of drive circuits in order to drive the fingerprint sensor module and the display panel. However, configuring two sets of drive circuits on the display panel requires two sets of signal lines, which increases the border of the panel. Moreover, since the wiring of the drive circuit on the outer side passes through the drive circuit on the inner side, the wiring becomes complicated, and it may result in need for multiple pitches or additional metal layers. Consequently, the manufacturing cost of the display panel is significantly increased, which is not favorable for the commercialization of the display panel.

SUMMARY

The disclosure provides a shift register circuit for a display panel with a built-in fingerprint sensor module to achieve reduction of a border and solve the problem of line crossing when two sets of shift registers are used.

A shift register circuit according to the disclosure is coupled to a display panel and a fingerprint sensor module, and includes a first dummy shift register, a second dummy shift register, a plurality of shift registers, and a plurality of module selection switches. The first dummy shift register is configured to receive a display start signal. The shift registers are connected in series between the first dummy shift register and the second dummy shift register, and are divided into a plurality of shift register groups. One of the shift registers of each of the shift register groups receives one of a plurality of sensing start signals, and enabling periods of the sensing start signals and the display start signal do not overlap. The module selection switches jointly receive a module selection signal, and are respectively coupled between the first dummy shift register and the shift register groups or between the shift register groups. The output selectors are respectively coupled between an output terminal of the corresponding one of the first dummy shift register, the shift registers, and the second dummy shift register, and the display panel and the fingerprint sensor module, and jointly receive a display switch signal and a sensing switch signal.

Based on the above, in the shift register circuit according to the embodiments of the disclosure, the display panel and the fingerprint sensor module share the same set of shift registers through the output selectors and the module selection switches, thereby achieving reduction of the border and solving the problem of line crossing between two sets of shift registers.

In order to make the above and other features and advantages of the disclosure more comprehensible, exemplary embodiments are described in detail hereinafter in conjunction with the accompanying drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Unless otherwise defined, all terms (including technical and scientific terms) used herein have the same meaning as commonly understood by those of ordinary skill in the art. It will be further understood that terms such as those defined in commonly used dictionaries should be interpreted as having meanings consistent with their meanings in the context of related technologies and the present disclosure, and will not be interpreted in an idealized or excessively formal sense unless explicitly defined as such in this article.

It should be understood that although the terms "first", "second", "third", etc. may be used herein to describe various elements, components, regions, layers and/or parts, these elements, components, regions, and/or parts should not be restricted by these terms. These terms are only used to distinguish one element, component, region, layer or part from another element, component, region, layer or part. Therefore, the "first element", "first component", "first region", "first layer" or "first part" discussed below may be referred to as a second element, second component, second region, second layer or second part without departing from the teachings herein.

The terms used herein are only for the purpose of describing specific embodiments, and are not restrictive. As used herein, unless the content clearly indicates otherwise, the singular forms "a", "an" and "the" are intended to involve the plural forms, including "at least one"; "or" means "and/or". As used herein, the term "and/or" includes any and all combinations of one or more related listed items. It should also be understood that when used in this specification, the terms "including" and/or "comprising" designate the presence of the features, regions, wholes, steps, operations, elements, and/or components, but do not exclude the presence or addition of one or more other features, overall regions, steps, operations, elements, components, and/or combinations thereof.

Figure 1:
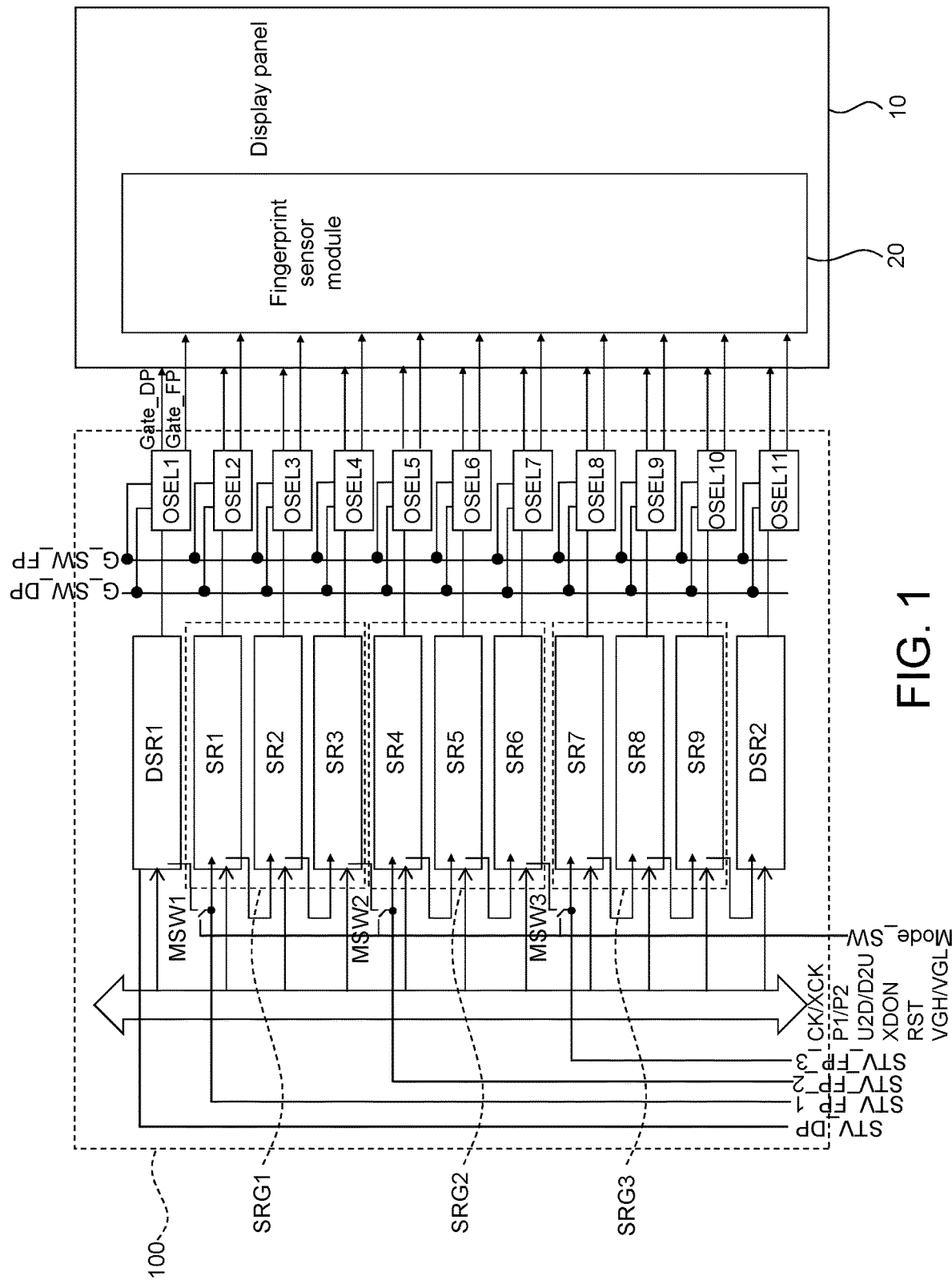
FIG. 1 is a system schematic diagram of a shift register circuit coupled to a display panel and a fingerprint sensor module according to an embodiment of the disclosure.

FIG. 1 is a system schematic diagram of a shift register circuit 100 coupled to a display panel 10 and a fingerprint sensor module 20 according to an embodiment of the disclosure. Referring to FIG. 1, in this embodiment, the fingerprint sensor module 20 is built in the display panel 10, and the shift register circuit 100 includes at least one first dummy shift register (such as DSR1), a plurality of shift registers (such as SR1 to SR9), at least one second dummy shift register (such as DSR2), a plurality of module selection switches (such as MSW1 to MSW3), and a plurality of output selectors (such as OSEL1 to OSEL11). The numbers of the at least one first dummy shift register, the shift registers, the at least one second dummy shift register, the module selection switches, and the output selectors are exemplary and are not intended to limit the embodiment of the disclosure.

In this embodiment, the shift registers SR1 to SR9 are connected in series between the first dummy shift register DSR1 and the second dummy shift register DSR2, and are divided into a plurality of shift register groups (such as SRG1 to SRG3). The first dummy shift register DSR1 is configured to receive a display start signal STV_DP, and the first one (such as the shift register SR1, SR4 or SR7) of the shift registers (such as SR1 to SR9) of each shift register group (such as SRG1 to SRG3) receives one of a plurality of sensing start signals STV_FP_1 to STV_FP_3. For example, the shift register SR1 receives the sensing start signal STV_FP_1, the shift register SR4 receives the sensing start signal STV_FP_2, and the shift register SR7 receives the sensing start signal STV_FP_3.

The module selection switches MSW1 to MSW3 jointly receive a module selection signal Mode_SW, and are respectively coupled between the first dummy shift register DSR1 and the shift register groups SRG1 to SRG3 or between the shift register groups SRG1 to SRG3. For example, the module selection switch MSW1 is coupled between the first dummy shift register DSR1 and the shift register SR1 of the shift register group SRG1, the module selection switch MSW2 is coupled between the shift register SR3 of the shift register group SRG1 and the shift register SR4 of the shift register group SRG2, and the module selection switch MSW3 is coupled between the shift register SR6 of the shift register group SRG2 and the shift register SR7 of the shift register group SRG3.

The output selectors OSEL1 to OSEL11 are respectively coupled between an output terminal of the corresponding one of the first dummy shift register DSR1, the shift registers SR1 to SR9, and the second dummy shift register DSR2, and the display panel 10 and the fingerprint sensor module 20, and jointly receive a display switch signal G_SW_DP and a sensing switch signal G_SW_FP. The output selectors OSEL1 to OSEL11 provide a display gate signal Gate_DP to the display panel 10 or provide a sensing gate signal Gate_FP to the fingerprint sensor module 20 in response to the display switch signal G_SW_DP and the sensing switch signal G_SW_FP, and provide a plurality of display gate signals Gate_DP or a plurality of sensing gate signals Gate_FP that are sequentially enabled in response to voltage levels of the output terminals of the first dummy shift register DSR1, the shift registers SR1 to SR9, and the second dummy shift register DSR2.

In the embodiment of the disclosure, the first dummy shift register DSR1, the shift registers SR1 to SR9, and the second dummy shift register DSR2 further jointly receive a plurality of clock signals CK and XCK, a plurality of control signals P1, P2, U2D, D2U, XDON, and RST, a gate high voltage VGH, and a gate low voltage VGL to be started in response to the enabling of the sensing start signals STV_FP_1 to STV_FP_3 and the display start signal STV_DP. In addition, enabling periods of the sensing start signals STV_FP_1 to STV_FP_3 and the display start signal STV_DP do not overlap so as to control the first dummy shift register DSR1, the shift registers SR1 to SR9, and the second dummy shift register DSR2 to be sequentially started or only the shift registers (such as SR1 to SR9) of one of the shift register groups SRG1 to SRG3 to be sequentially started.

Figure 2:
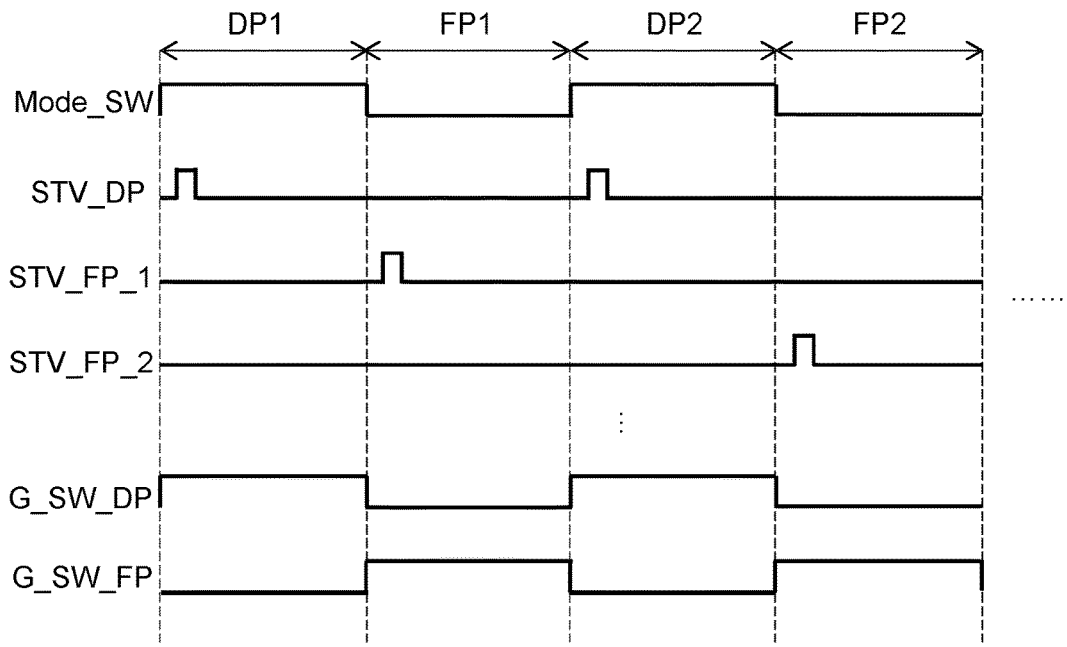
FIG. 2 is a schematic diagram of driving waveforms of a shift register circuit according to an embodiment of the disclosure.

For example, in display periods (DP1 and DP2 as shown in FIG. 2), the module selection signal Mode_SW is enabled to turn on the module selection switches MSW1 to MSW3. That is, the first dummy shift register DSR1, the shift registers SR1 to SR9, and the second dummy shift register DSR2 are in a state of being connected in series. The output selectors OSEL1 to OSEL11 are controlled through the display switch signal G_SW_DP and the sensing switch signal G_SW_FP so as to couple the output terminals of the first dummy shift register DSR1, the shift registers SR1 to SR9, and the second dummy shift register DSR2 to the display panel 10 through the output selectors OSEL1 to OSEL11.

In sensing periods (FP1 and FP2 as shown in FIG. 2), the module selection signal Mode_SW is disabled to turn off the module selection switches MSW1 to MSW3. That is, the first dummy shift register DSR1, the shift register groups SRG1 to SRG3, and the second dummy shift register DSR2 are in a state of being disconnected. The output selectors OSEL1 to OSEL11 are controlled through the display switch signal G_SW_DP and the sensing switch signal G_SW_FP so as to couple the output terminals of the first dummy shift register DSR1, the shift registers SR1 to SR9, and the second dummy shift register DSR2 to the fingerprint sensor module 20 through the output selectors OSEL1 to OSEL11.

According to the above, through the output selectors OSEL1 to OSEL11 and the module selection switches MSW1 to MSW3, the display panel 10 and the fingerprint sensor module 20 share the same set of shift registers SR1 to SR9, thereby achieving reduction of the border and solving the problem of line crossing between two sets of shift registers.

In the embodiment of the disclosure, the module selection switches (such as MSW1 to MSW3) may be N-type transistors or transmission gates. When the module selection switches (such as MSW1 to MSW3) are N-type transistors, the module selection signal Mode_SW at the control terminal of the transistor requires a higher voltage level to prevent attenuation of a critical voltage. Moreover, a single N-type transistor only requires one control signal line, which may have a smaller layout space, and when only the N-type transistor is used, the manufacturing process is relatively simple.

FIG. 2 is a schematic diagram of driving waveforms of a shift register circuit according to an embodiment of the disclosure. Referring to FIG. 1 and FIG. 2, in this embodiment, the sensing periods (such as FP1 to FP2) and the display periods (such as DP1 to DP2) are arranged alternately in time. That is, each sensing period (such as FP1 to FP2) is directly adjacent to two display periods (such as DP1 to DP2), the sensing periods (such as FP1 to FP2) are not directly adjacent to each other, and the display periods (such as DP1 to DP2) are not directly adjacent to each other.

In the embodiment of the disclosure, the display start signal STV_DP is enabled in a plurality of display periods DP1 to DP2 so as to sequentially start the first dummy shift register DSR1, the shift registers SR1 to SR9, and the second dummy shift register DSR2. That is, the voltage levels of the output terminals of the first dummy shift register DSR1, the shift registers SR1 to SR9, and the second dummy shift register DSR2 are sequentially enabled. At this time, the display switch signal G_SW_DP is enabled and the sensing switch signal G_SW_FP is disabled so as to transmit the voltage levels that are sequentially enabled to the display panel 10 through the output selectors OSEL1 to OSEL11 to form the display gate signals Gate_DP that are sequentially enabled.

On the other hand, the sensing start signals (such as STV_FP_1 to STV_FP_3) are respectively enabled in one of a plurality of sensing periods (such as FP1 to FP2). That is, only one of the sensing start signals (such as STV_FP_1 to STV_FP_3) is started in one sensing period (such as FP1 to FP2) so as to start one of the shift register groups SRG1 to SRG3. For example, in the sensing period FP1, the sensing start signal STV_FP_1 is enabled to sequentially start the shift registers SR1 to SR3 of the shift register group SRG1. That is, the voltage levels of the output terminals of the shift registers SR1 to SR3 are sequentially enabled, but the first dummy shift register DSR1 and the shift register SR4 (that is, the one directly adjacent to the shift register group SRG1) is not started. At this time, the display switch signal G_SW_DP is disabled and the sensing switch signal G_SW_FP is enabled so as to transmit the voltage levels that are sequentially enabled to the fingerprint sensor module 20 through the output selectors OSEL1 to OSEL11 to form the sensing gate signals Gate_FP that are sequentially enabled.

In the embodiment of the disclosure, in the display periods (such as DP1 to DP2), the sensing start signal (such as STV_FP_1 to STV_FP_3) is in a floating state so as to prevent the sensing start signal (such as STV_FP_1 to STV_FP_3) from affecting the operations of the first dummy shift register DSR1, the shift registers SR1 to SR9, and the second dummy shift register DSR2.

In the embodiment of the disclosure, a capacitance value of a pixel (not shown) of the display panel 10 and a capacitance value of a sensor (not shown) of the fingerprint sensor module 20 may be different, and as the sensing sensitivity increases, the capacitance value of the sensor (not shown) of the fingerprint sensor module 20 increases, and a driving time of the sensor of the fingerprint sensor module 20 becomes longer. In other words, when the capacitance value of the pixel (not shown) of the display panel 10 is greater than the capacitance value of the sensor (not shown) of the fingerprint sensor module 20, an operating frequency of the clock signal (such as CK and XCK) and the control signal (such as P1 and P2) in the display periods (such as DP1 to DP2) may be higher than an operating frequency of the clock signal (such as CK and XCK) and the control signal (such as P1 and P2) in the sensing periods (such as FP1 to FP2).

Figure 3:
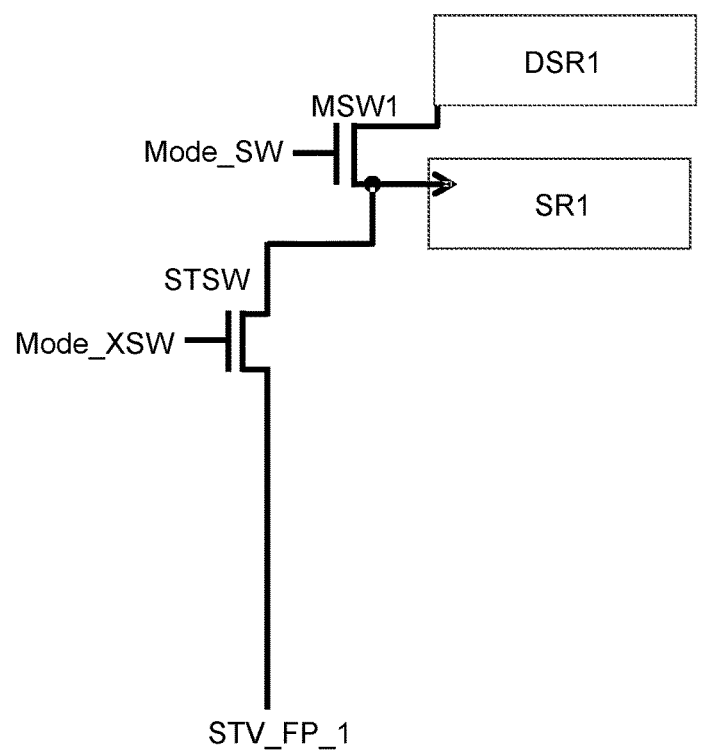
FIG. 3 is a system schematic diagram of a part of a shift register circuit according to an embodiment of the disclosure.

FIG. 3 is a system schematic diagram of a part of a shift register circuit according to an embodiment of the disclosure. Referring to FIG. 1 and FIG. 3, in this embodiment, the shift register circuit 100 further includes a plurality of signal transmission switches (such as STSW). Each signal transmission switch (such as STSW) is coupled between one of the shift registers (such as SR1 to SR9) of each shift register group (such as SRG1 to SRG3) and one of the sensing start signals STV_FP_1 to STV_FP_3, and are jointly controlled by a transmission switch signal Mode_XSW.

For example, the first signal transmission switch STSW may be configured between the first shift register SR1 of the shift register group SRG1 and the sensing start signal STV_FP_1, and similarly, the second signal transmission switch STSW may be configured between the first shift register SR4 of the shift register group SRG2 and the sensing start signal STV_FP_2, and the third signal transmission switch STSW may be configured between the first shift register SR7 of the shift register group SRG3 and the sensing start signal STV_FP_3.

In the embodiment of the disclosure, the module selection switches (such as MSW1 to MSW3) and the signal transmission switch STSW are respectively N-type transistors, and the transmission switch signal Mode_XSW and the module selection signal Mode_SW have opposite phases. In other words, in the display periods (DP1 and DP2 as shown in FIG. 2), the module selection signal Mode_SW is enabled and the transmission switch signal Mode_XSW is disabled so as to disconnect the sensing start signal (such as STV_FP_1 to STV_FP_3) and the shift registers SR1 to SR9. Moreover, in the sensing periods (FP1 and FP2 as shown in FIG. 2), the module selection signal Mode_SW is disabled and the transmission switch signal Mode_XSW is enabled so as to transmit the sensing start signal (such as STV_FP_1 to STV_FP_3) to the shift registers SR1, SR4, and SR7.

Figure 4:
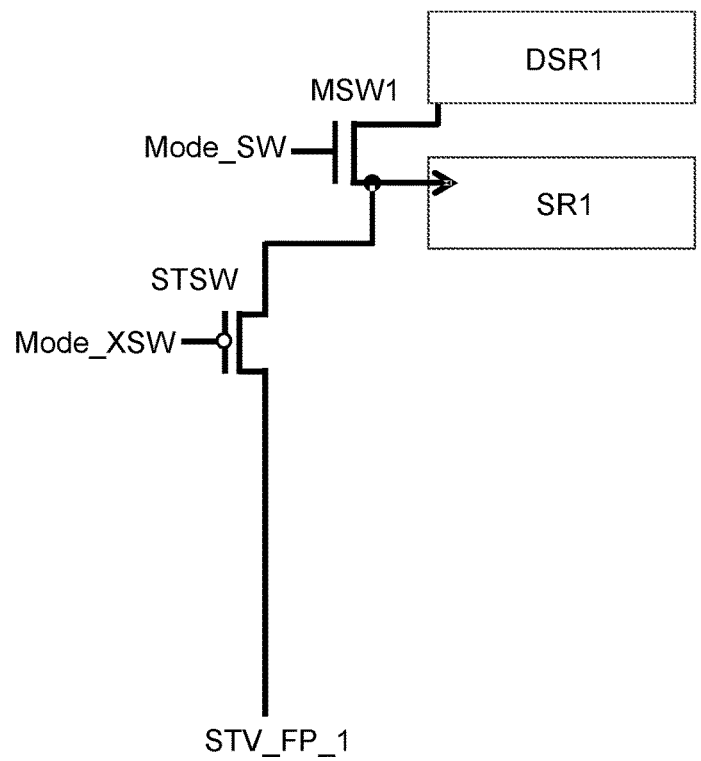
FIG. 4 is a system schematic diagram of a part of a shift register circuit according to another embodiment of the disclosure.

FIG. 4 is a system schematic diagram of a part of a shift register circuit according to another embodiment of the disclosure. Referring to FIG. 1, FIG. 3, and FIG. 4, in this embodiment, the module selection switches (such as MSW1 to MSW3) are respectively N-type transistors, and the signal transmission switches STSW are respectively P-type transistors. The transmission switch signal Mode_XSW and the module selection signal Mode_SW may be the same signal, and the operations of the module selection switches (such as MSW1 to MSW3) and the signal transmission switch STSW are as described in the embodiment of FIG. 3. Here, the transmission switch signal Mode_XSW and the module selection signal Mode_SW may be transmitted through the same control signal line, which has a smaller layout space.

Figure 5:
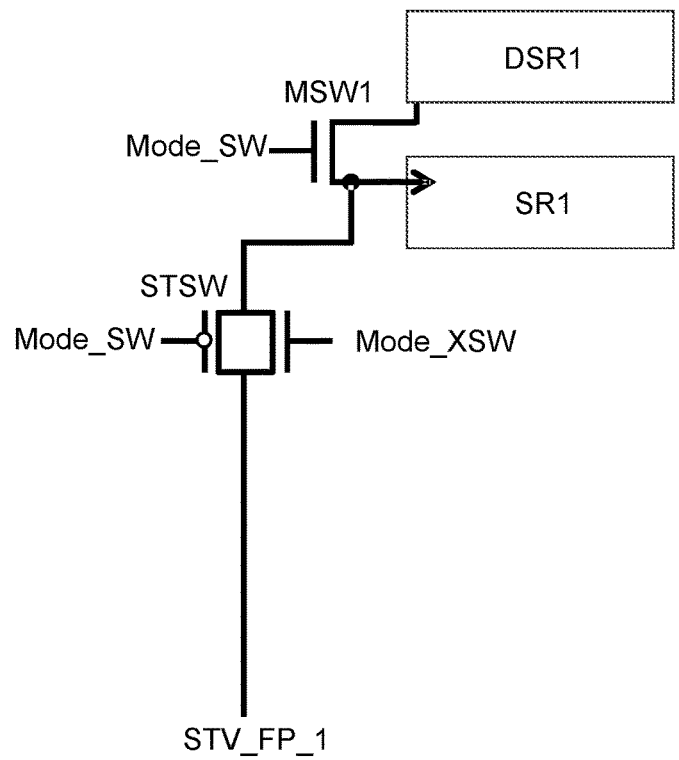
FIG. 5 is a system schematic diagram of a part of a shift register circuit according to another embodiment of the disclosure.

FIG. 5 is a system schematic diagram of a part of a shift register circuit according to another embodiment of the disclosure. Referring to FIG. 1, FIG. 3, and FIG. 5, in this embodiment, the module selection switches (such as MSW1 to MSW3) are respectively N-type transistors, and the signal transmission switches STSW are respectively transmission gates. The transmission switch signal Mode_XSW and the module selection signal Mode_SW are opposite to each other, and an inverted phase control terminal of the transmission gate receives the module selection signal Mode_SW and a positive phase control terminal of the transmission gate receives the transmission switch signal Mode_XSW. The operations of the module selection switches (such as MSW1 to MSW3) and the signal transmission switch STSW are as described in the embodiment of FIG. 3. Through the electrical characteristics of the transmission gate, attenuation of the critical voltage is prevented. Therefore, the module selection signal Mode_SW does not require a higher voltage level.

Figure 6:
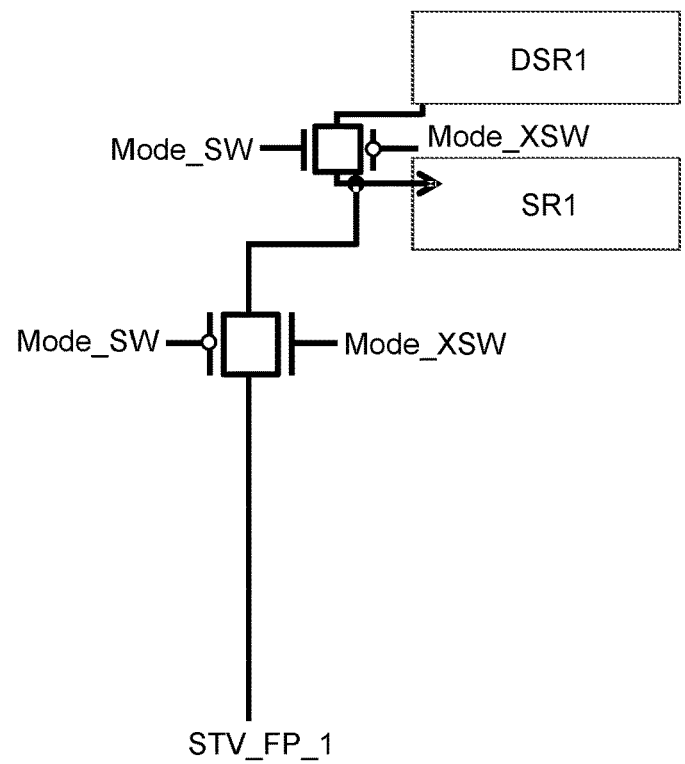
FIG. 6 is a system schematic diagram of a part of a shift register circuit according to another embodiment of the disclosure.

FIG. 6 is a system schematic diagram of a part of a shift register circuit according to another embodiment of the disclosure. Referring to FIG. 1, FIG. 3, and FIG. 6, in this embodiment, the module selection switches (such as MSW1 to MSW3) are respectively first transmission gates, and the signal transmission switches STSW are respectively second transmission gates. The transmission switch signal Mode_XSW and the module selection signal Mode_SW are opposite to each other, and an inverted phase control terminal of the first transmission gate receives the transmission switch signal Mode_XSW and a positive phase control terminal of the first transmission gate receives the module selection signal Mode_SW, and an inverted phase control terminal of the second transmission gate receives the module selection signal Mode_SW and a positive phase control terminal of the second transmission gate receives the transmission switch signal Mode_XSW. The operations of the module selection switches (such as MSW1 to MSW3) and the signal transmission switch STSW are as described in the embodiment of FIG. 3. Through the electrical characteristics of the transmission gate, attenuation of the critical voltage is prevented. Therefore, the module selection signal Mode_SW does not require a higher voltage level.

Figure 7:
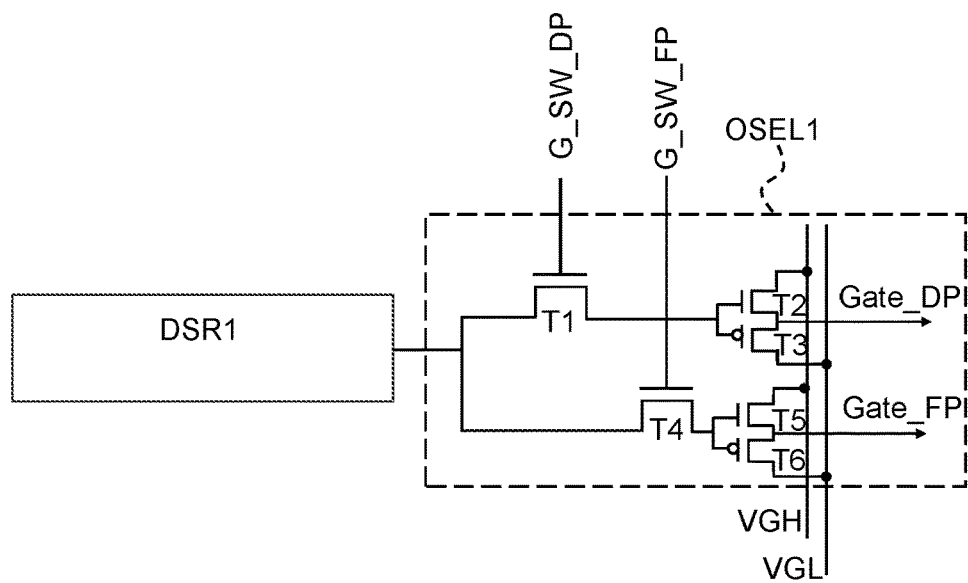
FIG. 7 is a system schematic diagram of an output selector according to an embodiment of the disclosure.

FIG. 7 is a system schematic diagram of an output selector according to an embodiment of the disclosure. Referring to FIG. 1 and FIG. 7, in this embodiment, the output selector OSEL1 is described as an example, and the output selectors OSEL2 to OSEL11 are the same as the output selector OSEL1. The output selector OSEL1 includes a first transistor T1, a second transistor T2, a third transistor T3, a fourth transistor T4, a fifth transistor T5, and a sixth transistor T6, wherein the first transistor T1, the second transistor T2, the fourth transistor T4, and the fifth transistor T5 are, for example, N-type transistors, and the third transistor T3 and the sixth transistor T6 are, for example, P-type transistors.

The first transistor T1 has a first terminal coupled to the output terminal of the first dummy shift register DSR1, a control terminal receiving the display switch signal G_SW_DP, and a second terminal. The second transistor T2 has a first terminal receiving a gate high voltage VGH, a control terminal coupled to the second terminal of the first transistor T1, and a second terminal coupled to the display panel 10. The third transistor T3 has a first terminal receiving a gate low voltage VGL, a control terminal coupled to the second terminal of the first transistor T1, and a second terminal coupled to the display panel 10.

The fourth transistor T4 has a first terminal coupled to the output terminal of the first dummy shift register DSR1, a control terminal receiving the sensing switch signal G_SW_FP, and a second terminal. The fifth transistor T5 has a first terminal receiving the gate high voltage VGH, a control terminal coupled to the second terminal of the fourth transistor T4, and a second terminal coupled to the fingerprint sensor module 20. The sixth transistor T6 has a first terminal receiving the gate low voltage VGL, a control terminal coupled to the second terminal of the fourth transistor T4, and a second terminal coupled to the fingerprint sensor module 20.

In the output selectors OSEL2 to OSEL11, the first terminal of the first transistor T1 is coupled to the output terminal of the corresponding one of the shift registers SR1 to SR9 and the second dummy shift register DSR2, and the first terminal of the fourth transistor T4 is coupled to the output terminal of the corresponding one of the shift registers SR1 to SR9 and the second dummy shift register DSR2.

Figure 8:
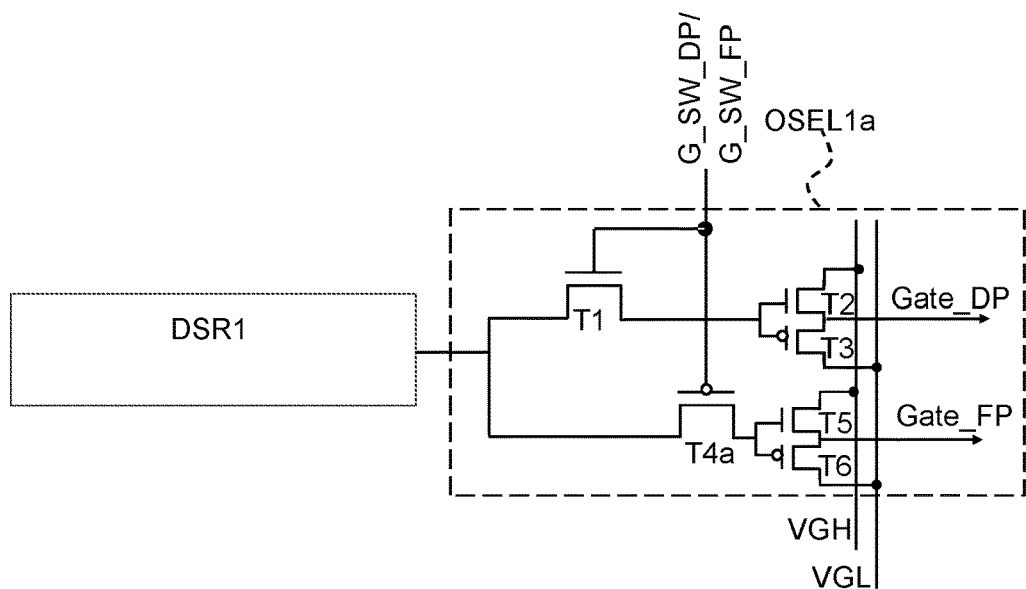
FIG. 8 is a system schematic diagram of an output selector according to another embodiment of the disclosure.

FIG. 8 is a system schematic diagram of an output selector according to another embodiment of the disclosure. Referring to FIG. 1, FIG. 7, and FIG. 8, in this embodiment, an output selector OSEL1a is similar to the output selector OSEL1, and the difference is that the first transistor T1 is an N-type transistor and a fourth transistor T4a is a P-type transistor. At this time, the display switch signal G_SW_DP and the sensing switch signal G_SW_FP may be the same signal so as to save the layout cost of one signal line.

Figure 9:
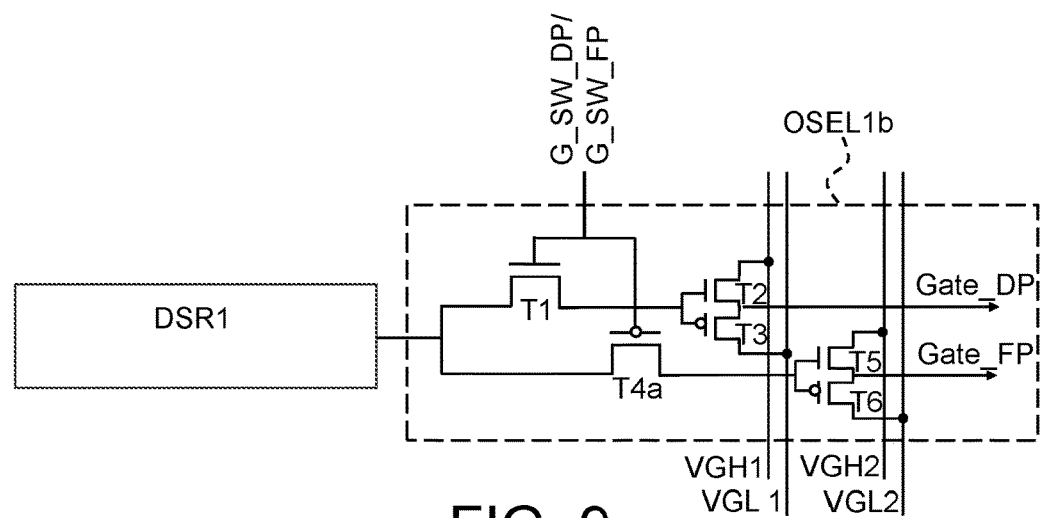
FIG. 9 is a system schematic diagram of an output selector according to another embodiment of the disclosure.

FIG. 9 is a system schematic diagram of an output selector according to another embodiment of the disclosure. Referring to FIG. 1 and FIG. 7 to FIG. 9, in this embodiment, an output selector OSEL1b is similar to the output selector OSEL1a, and the difference is that the first terminal of the second transistor T2 receives a first gate high voltage VGH1, the first terminal of the third transistor T3 receives a first gate low voltage VGL1, the first terminal of the fifth transistor T5 receives a second gate high voltage VGH2, and the first terminal of the sixth transistor T6 receives a second gate low voltage VGL2.

In the embodiment of the disclosure, different from that the first terminals of the second transistor T2 and the fifth transistor T5 receive the same gate high voltage VGH (equivalent to the first gate high voltage VGH1 being the same as the second gate high voltage VGH2) and the first terminals of the third transistor T3 and the sixth transistor T6 receive the same gate low voltage VGL (equivalent to the first gate low voltage VGL1 being the same as the second gate low voltage VGL2), the first gate high voltage VGH1 received by the first terminal of the second transistor T2 may be different from the second gate high voltage VGH2 received by the first terminal of the fifth transistor T5, and the first gate low voltage VGL1 received by the first terminal of the third transistor T3 may be different from the second gate low voltage VGL2 received by the first terminal of the sixth transistor T6. In this way, the voltage level (or voltage range) of the display gate signal Gate_DP may be different from the voltage level (or voltage range) of the sensing gate signal Gate_FP.

Figure 10:
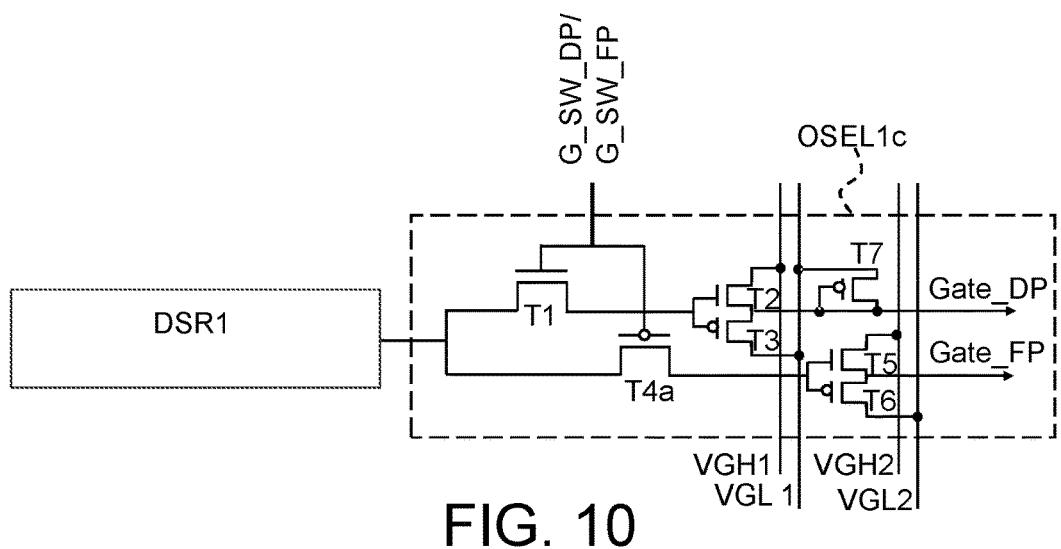
FIG. 10 is a system schematic diagram of an output selector according to another embodiment of the disclosure.

FIG. 10 is a system schematic diagram of an output selector according to another embodiment of the disclosure. Referring to FIG. 1 and FIG. 7 to FIG. 10, in this embodiment, an output selector OSEL1c is similar to the output selector OSEL1b, and the difference is that the output selector OSEL1c further includes a seventh transistor T7. The seventh transistor T7 has a first terminal receiving the first gate low voltage VGL1, a control terminal coupled to the display panel 10, and a second terminal coupled to the display panel 10. In this way, the voltage stability may be maintained when the display gate signal Gate_DP is at a low level.

In summary of the above, in the shift register circuit according to the embodiments of the disclosure, the display panel and the fingerprint sensor module share the same set of shift registers through the output selectors and the module selection switches, thereby achieving reduction of the border and solving the problem of line crossing between two sets of shift registers.

Although the disclosure has been described in detail with reference to the foregoing embodiments, they are not intended to limit the disclosure. Those of ordinary skill in the art should understand that it is still possible to make changes and modifications without departing from the spirit and scope of the disclosure. The scope of protection of the disclosure shall be defined by the following claims.

What is claimed is:

1. A shift register circuit, coupled to a display panel and a fingerprint sensor module, comprising:
   a first dummy shift register configured to receive a display start signal;
   a second dummy shift register;
   a plurality of shift registers connected in series between the first dummy shift register and the second dummy shift register and divided into a plurality of shift register groups, wherein one of the shift registers of each of the shift register groups receives one of a plurality of sensing start signals, and enabling periods of the sensing start signals and the display start signal do not overlap;
   a plurality of module selection switches jointly receiving a module selection signal and respectively coupled between the first dummy shift register and the shift register groups or between the shift register groups; and
   a plurality of output selectors respectively coupled between an output terminal of a corresponding one of the first dummy shift register, the shift registers, and the second dummy shift register, and the display panel and the fingerprint sensor module, and jointly receiving a display switch signal and a sensing switch signal.

2. The shift register circuit according to claim 1, wherein the sensing start signals are respectively enabled in one of a plurality of sensing periods, and the display start signal is enabled in a plurality of display periods, wherein the sensing periods and the display periods are arranged alternately in time.

3. The shift register circuit according to claim 2, wherein in the display periods, the display start signal and the module selection signal are enabled to turn on the module selection switches, and sequentially start the first dummy shift register, the shift registers, and the second dummy shift register, and in one of the sensing periods, one of the sensing start signals is enabled, and the module selection signal is disabled to disconnect the shift register groups and sequentially start the shift registers of one of the shift register groups.

4. The shift register circuit according to claim 3, wherein in the display periods, the sensing start signals are in a floating state.

5. The shift register circuit according to claim 1, wherein the first dummy shift register, the shift registers, and the second dummy shift register further jointly receive a plurality of clock signals and a plurality of control signals.

6. The shift register circuit according to claim 5, wherein an operating frequency of the clock signals and the control signals in a display period is higher than an operating frequency of the clock signals and the control signals in a sensing period.

7. The shift register circuit according to claim 1, further comprising a plurality of signal transmission switches respectively coupled between one of the shift registers of each of the shift register groups and one of the sensing start signals, and controlled by a transmission switch signal.

8. The shift register circuit according to claim 7, wherein the transmission switch signal is enabled in a sensing period and disabled in a display period.

9. The shift register circuit according to claim 8, wherein the module selection switches and the signal transmission switches are respectively N-type transistors, and the transmission switch signal and the module selection signal have opposite phases.

10. The shift register circuit according to claim 8, wherein the module selection switches are respectively N-type transistors, and the signal transmission switches are respectively P-type transistors, wherein the transmission switch signal and the module selection signal are the same signal.

11. The shift register circuit according to claim 8, wherein the module selection switches are respectively N-type transistors, and the signal transmission switches are respectively transmission gates, wherein the transmission switch signal and the module selection signal are opposite to each other, and an inverted phase control terminal of the transmission gate receives the module selection signal and a positive phase control terminal of the transmission gate receives the transmission switch signal.

12. The shift register circuit according to claim 8, wherein the module selection switches are respectively first transmission gates, and the signal transmission switches are respectively second transmission gates, wherein the transmission switch signal and the module selection signal are opposite to each other, an inverted phase control terminal of the first transmission gate receives the transmission switch signal and a positive phase control terminal of the first transmission gate receives the module selection signal, and an inverted phase control terminal of the second transmission gate receives the module selection signal and a positive phase control terminal of the second transmission gate receives the transmission switch signal.

13. The shift register circuit according to claim 1, wherein in a display period, the output terminals of the first dummy shift register, the shift registers, and the second dummy shift register are coupled to the display panel through the display switch signal and the sensing switch signal, and in a sensing period, the output terminals of the first dummy shift register, the shift registers, and the second dummy shift register are coupled to the fingerprint sensor module through the display switch signal and the sensing switch signal.

14. The shift register circuit according to claim 13, wherein each of the output selectors comprises:
   a first transistor having a first terminal coupled to the output terminal of the corresponding one of the first dummy shift register, the shift registers, and the second dummy shift register, a control terminal receiving the display switch signal, and a second terminal;
   a second transistor having a first terminal receiving a first gate high voltage, a control terminal coupled to the second terminal of the first transistor, and a second terminal coupled to the display panel;
   a third transistor having a first terminal receiving a first gate low voltage, a control terminal coupled to the second terminal of the first transistor, and a second terminal coupled to the display panel;
   a fourth transistor having a first terminal coupled to the output terminal of the corresponding one of the first dummy shift register, the shift registers, and the second dummy shift register, a control terminal receiving the sensing switch signal, and a second terminal;
   a fifth transistor having a first terminal receiving a second gate high voltage, a control terminal coupled to the second terminal of the fourth transistor, and a second terminal coupled to the fingerprint sensor module; and
   a sixth transistor having a first terminal receiving a second gate low voltage, a control terminal coupled to the second terminal of the fourth transistor, and a second terminal coupled to the fingerprint sensor module.

15. The shift register circuit according to claim 14, wherein when the first transistor is an N-type transistor and the fourth transistor is a P-type transistor, the display switch signal and the sensing switch signal are the same signal.

16. The shift register circuit according to claim 14, wherein the first gate high voltage is the same as the second gate high voltage, and the first gate low voltage is the same as the second gate low voltage.

17. The shift register circuit according to claim 14, wherein each of the output selectors comprises:
   a seventh transistor having a first terminal receiving the first gate low voltage, a control terminal coupled to the display panel, and a second terminal coupled to the display panel.

* * * * *